United States Patent [19]

Yokota

[11] Patent Number: 4,640,549
[45] Date of Patent: Feb. 3, 1987

[54] HEADREST FOR A VEHICLE SEAT

[75] Inventor: Masaaki Yokota, Akishima, Japan

[73] Assignee: Tachikawa Spring Co. Ltd, Tokyo, Japan

[21] Appl. No.: 739,064

[22] Filed: May 29, 1985

[30] Foreign Application Priority Data

May 31, 1984 [JP] Japan ............................. 59-80778[U]

[51] Int. Cl.[4] .............................................. A47C 7/36
[52] U.S. Cl. ................................... 297/410; 297/356; 297/408; 403/93
[58] Field of Search ............... 297/410, 396, 406, 407, 297/408, 409, 356; 403/93

[56] References Cited

U.S. PATENT DOCUMENTS

| 2,434,007 | 1/1948 | O'Dea | 297/409 X |
| 3,484,831 | 12/1969 | Higuchi | 297/356 X |
| 4,304,439 | 12/1981 | Terada et al. | 297/408 X |
| 4,351,563 | 9/1982 | Hattori | 297/408 |
| 4,370,898 | 2/1983 | Maruyama | 297/408 X |

FOREIGN PATENT DOCUMENTS

| 236066 | 10/1964 | Austria | 403/93 |
| 647324 | 10/1962 | Italy | 403/93 |
| 155128 | 9/1982 | Japan | 297/408 |
| 1149761 | 4/1969 | United Kingdom | 297/356 |

Primary Examiner—William E. Lyddane
Assistant Examiner—Laurie K. Cranmer
Attorney, Agent, or Firm—Cushman, Darby & Cushman

[57] ABSTRACT

A headrest for seats for use in vehicles has a fixed frame fixedly secured to the upper ends of stays supported on a seat back, two right and left movable frames secured to a panel of the headrest, and two pairs of parallel links connecting the fixed and movable frames; a first pair connecting the right movable frame to the right end portion of the fixed frame, and a second pair connecting the left movable frame to the left end portion of the fixed frame. One of the first pair of links is connected with one of the second pair via a connecting portion. With such structure, the headrest can be moved back and forth with little change in height, and, since there are no moving parts present in all portions of the headrest except in the two end portions of the fixed frame, a throughbore can be provided in the central portion of the headrest.

1 Claim, 6 Drawing Figures

HEADREST FOR A VEHICLE SEAT

BACKGROUND OF THE INVENTION

1. Field of the Invention

The present invention relates to a headrest for a vehicle seat, and, in particular, to such headrest of the type that the headrest proper can be directly operated so as to simply adjust its longitudinal positions relative to a seat back, that is, the distance between the occupant's head and itself.

2. Description of the Prior Art

Conventionally, as headrests of this kind, there have been well known three types of headrests. A first one of them is provided with a gear mechanism located between a headrest proper and a rotary support member and maintained in constant mesh. In this headrest, such gear mechanism can be rotatively operated by a knob attached to the headrest proper so as to adjust the rotational angle of the headrest proper. A second one is equipped with a lock mechanism in its rotary support member which can be unlocked by means of external button operation to rotate a headrest proper for its angular adjustment. A third one includes in the rotary support portion of the headrest proper a rotary mechanism having a friction action so that the headrest proper can be directly operated or rotated.

In the former two conventional headrests, it is true that the respective rotary support portions of their respective headrests proper are enough to bear the loads of the occupant's head in case of collisions or the like because their teeth are maintained meshed with one another in the first example and the lock mechanism maintains the rotary support portion in its locked position. However, when adjusting the angles of rotation of the respective headrests proper, in both the forward and rearward directions, it is necessary to operate the knob rotatively or to operate a lock release button, which delays the angular adjustments, that is, quick adjustments are impossible.

On the other hand, in the last-mentioned conventional headrest, since the rotary support postion of the headrest proper is maintained in its engaged condition due to friction action, the adjustment of angle of rotation of the headrest proper can be performed by pushing it directly. However, when a grater load due to the shocks of the occupant's head occurring in case of collisions or the like is applied to the headrest proper, it may be rotated unnecessarily, which makes it impossible to hold the occupant's head positively upright. If the friction of the rotary support portion is increased in order to prevent such unnecessary rotation, then the adjustment of the angle of rotation cannot be carried out smoothly.

There is known an improved headrest which is disclosed in Japanese Utility Model No. 52863 of 1982, aimed at eliminating the drawbacks in the above-mentioned prior art headrests. However, since the improved headrest is constructed such that it can be adjusted forwardly or rearwardly by rotating itself, its surface in contact with the occupant's head may be faced upwardly or downwardly according to the forward or rearward adjustment thereof, resulting in troublesome or inconvenient use thereof.

SUMMARY OF THE INVENTION

The present invention aims at eliminating the drawbacks in the above-mentioned conventional headrests to provide an improved headrest which is more attractive in appearance and of higher commercial value, and also which can be adjusted for longitudinal, that is, forward or rearward movements without changing its height level.

Accordingly, it is an object of the invention to provide a new headrest which can be moved forwardly or rearwardly with no rotational movement, that is, with its surface in contact with the occupant's head being constantly maintained in a vertical condition.

In attaining the above object, according to one aspect of the invention, a movable frame is attached via a pair of parallel links to a fixed frame which is fixedly secured to the upper end of a stay to be supported by a seat back. A headrest proper of the invention, therefore, can be moved parallel back and forth with its surface in contact with the occupant's head being constantly maintained in a predetermined direction, that is, with no possiblity of the surface being faced upwardly or downwardly during such parallel displacements. As a result of this arrangement, the area of contact with the occupant's head will never be varied through the backward and forward movements of the headrest so that an excellent feeling in use can be obtained.

It is another object of the invention to provide a headrest which is more attractive in appearance and is simpler in structure.

In order to achieve this object, according to another aspect of the invention, a pair of right and left parallel links are connected at their respective lower ends with each other. Therefore, in other portions than the two and portions of the above-mentioned fixed frame, there exists no mechanisms, so that the headrest can be provided with a through bore in its central portion.

It is still another object of the invention to provide a headrest which is improved in operation.

To accomplish this object, according to still another aspect of the invention, a lock plate having engagement teeth is attached to the fixed frame and at the same time to the movable frame there is mounted a stopper to be engaged with one of the engagement teeth by a spring, so that the headrest proper can be locked into a desired position by simply moving it forwardly.

In addition, the lock plate is provided with a first projection which, when the movable frame is moved forwardly, becomes engaged with the front end of the stopper to rotate the stopper in a direction opposite its engaged position with the above-mentioned engagement teeth, and a second projection which, when the movable frame is moved backward, rotates the stopper in a second direction to be engaged with the engagement teeth. As a result of this feature, it is possible to adjust the position of the headrest back and forth only by moving it forwardly, that is, the headrest of the invention can be adjusted in position in a simple manner.

The above and other related objects and features of the invention will be apparent from a reading of the following description of the disclosure found in the accompanying drawings and the novelty thereof pointed out in the appended claims.

DETAILED DESCRIPTION OF A PREFERRED EMBODIMENT OF THE INVENTION

Figure 1:
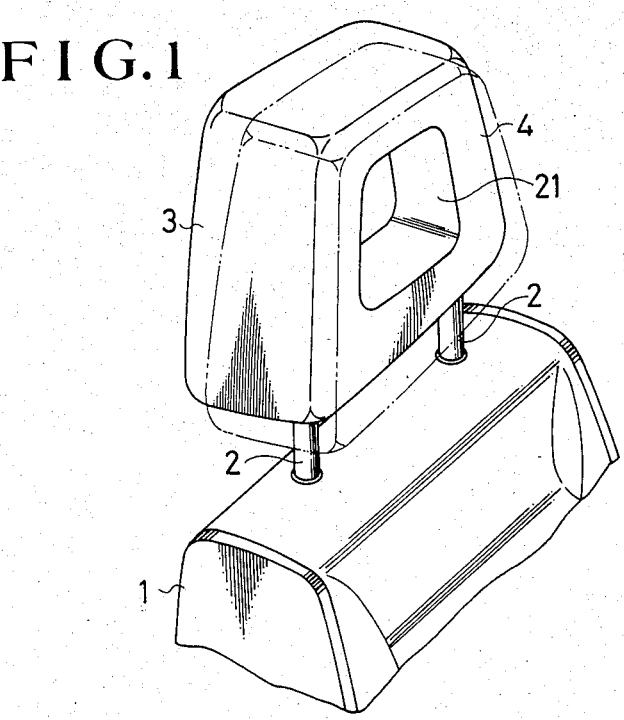
FIG. 1 is a perspective view of a headrest according to the invention, illustrating a typical manner in which it is used for a vehicle seat.

Referring first to FIG. 1, there is shown in perspective a forward portion of a vehicle seat provided with a headrest of the invention. In particular, on the upper surface of a seat back (1) there is provided a headrest (3) which limits the relative rearward displacement of the occupant's head. This headrest (3) comprises a headrest proper (4) which is formed by enclosing a panel of a desired shape with a cushion member made of foam material or the like and further covering it with a covering material, and stays (2) which are mounted to an upper or top surface of the seat back (1) in a vertically adjustable manner, with the headrest proper (4) being adjustable or movable in its forward and rearward direction with respect to the stays (2).

Figure 2:
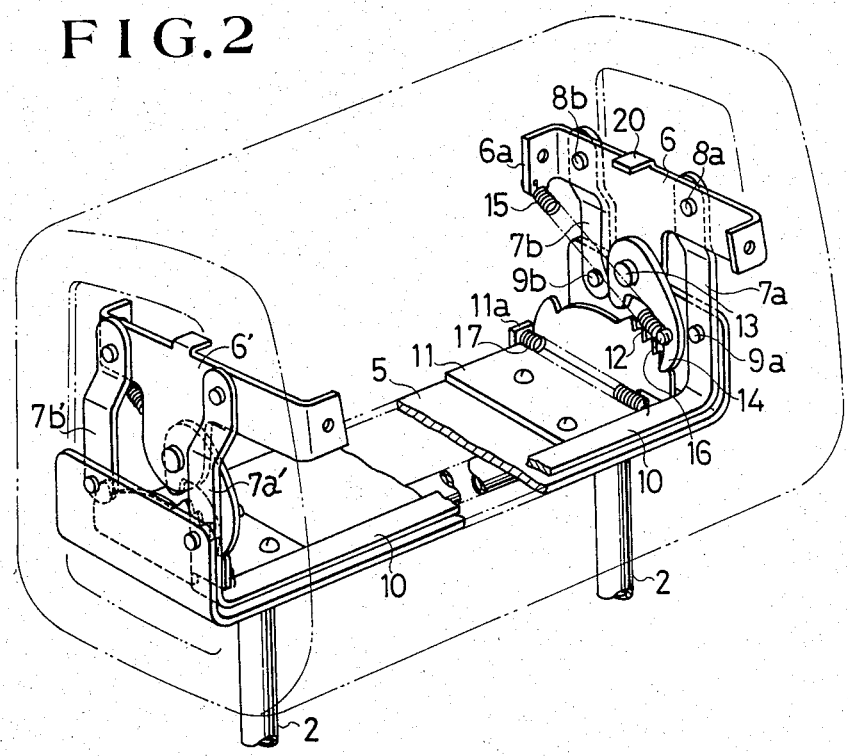
FIG. 2 is a partially cutaway perspective view of the main portions of the headrest of the invention.

Now, we will describe in detail the headrest (3) in connection with FIG. 2 and its following figures.

In FIG. 2, there is shown a backward perspective view of the headrest (3), illustrating a portion of the internal mechanism of the headrest (3). As shown, a fixed frame (5) is attached onto the stay (2) by welding or the like, with its two end-portions being bent and raised upwardly. To each of the two upwardly bent end portions, there is mounted a movable frame (6) through a pair of parallel links (7a),(7b) such that the movable frame (6) can be moved back and forth. In FIG. 2 shafts (8a), (9a) and (8b), (9b) respectively serve as centers of rotation of the paired parallel links (7a), (7b). Although not shown, it can be easily understood that the left-side end portion of the fixed frame (5) is similarly arranged so that there are provided another movable frame (6') and another pair of parallel links (7a'), (7b'). The lift-side link (7a') and the right-side link (7a) are connected at their respective lower ends with each other via a connecting portion (10), so that the left-and right-side movable frames (6') and (6) can be operated cooperatively with each other.

Figure 3:
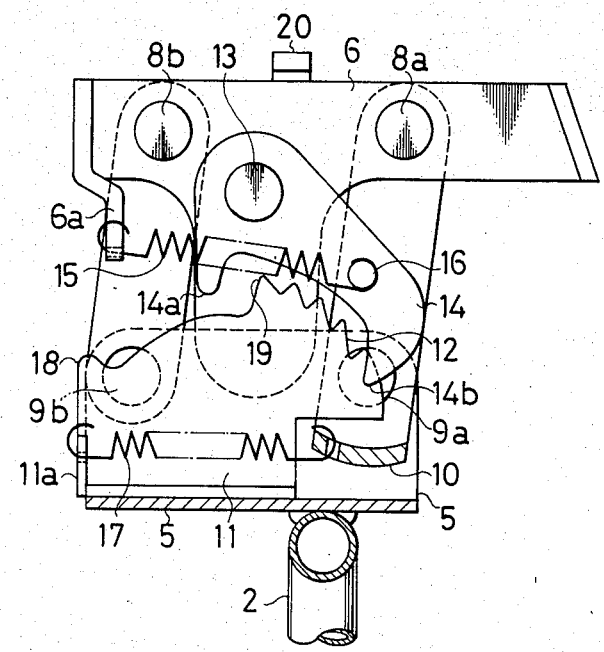
FIGS. 3 through 6 are side views of the above headrest, respectively illustrating its operational conditions.

As shown in FIG. 2, on the fixed frame (5), there is secured a lock plate (11) which is formed along its upper edge with a plurality of serrated engagement teeth (12), as clearly can be seen in FIG. 3 and its following figures as well. As stopper (14) is rotatably mounted to the movable frame (6) via a shaft (13), with one end (rear end in the illustrated embodiment shown in FIGS. 3-6) (14b) of the stopper (14) being engaged with one of the engagement teeth (12). A spring (15) is extended between the front end (6a) of the movable frame (6) and a pin (16) planted in a portion of the stopper (14) and is normally biasing the stopper (14b) rotatively such that the rear end (14) of the stopper (14) can be engaged with one of the engagement teeth (12). Also, between a portion (11a) of the lock plate (11) and the connecting portion (10), there is extended another spring (17) normally energizing the movable frame (6) backwardly. Therefore, by pushing the movable frame (6), namely, the headrest proper (4) forwardly, the rear end (14b) of the stopper (14) can be slided over the engagement teeth (12) sequentially, so that the movable frame (6) can be moved from its rearmost position shown in FIG. 3 up to its foremost position shown in FIG. 4. During this movement, the movable frame (6) is able to occupy a given number of locking positions (five locking positions in the illustrated embodiment) with respect to the fixed frame (5). At each of these locking positions, even if the movable frame (6), namely, the headrest proper (4) is pushed backwardly, it can never be displaced backwardly but can be locked positively, since the rear end (14b) of the stopper (14) is engaged with one of the engagement teeth (12). The shapes of the rear end (14b) of the stopper (14) and the engagement teeth (12) are selected such that, as described above, the movable frame (6) can be moved forwardly but it cannot be moved rearwardly.

Figure 4:
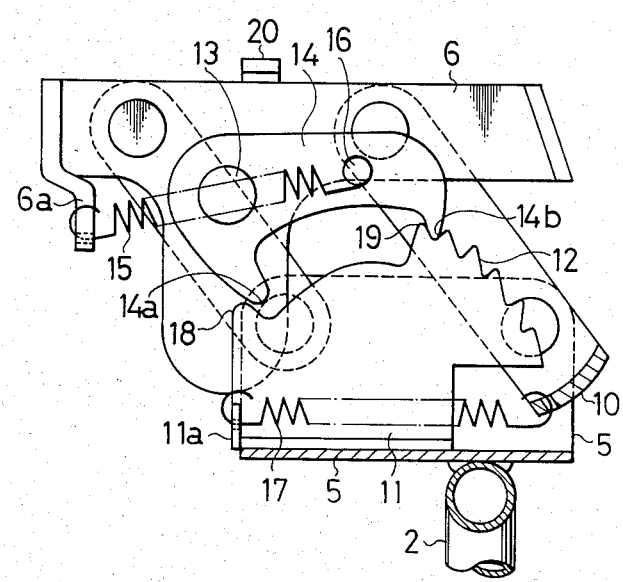
Figure 5:
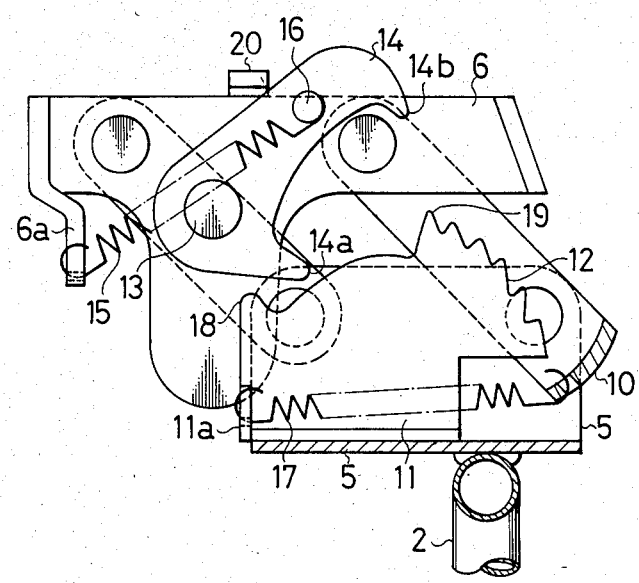
Figure 6:
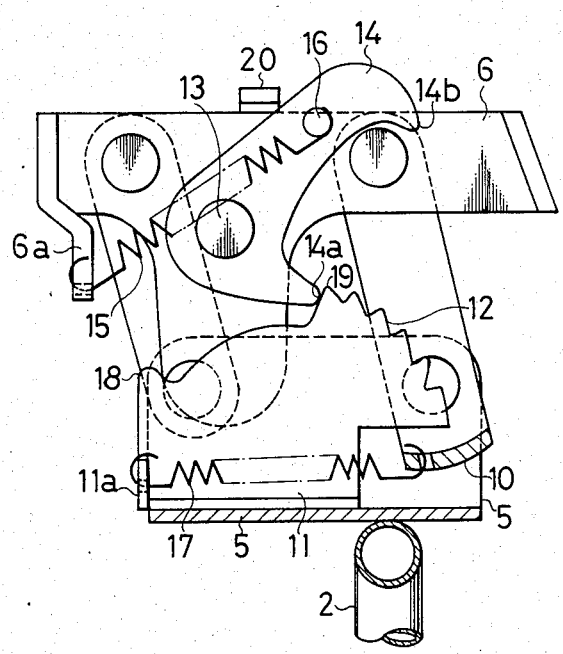

As shown in FIG. 3, the lock plate (11) is formed with a first projection (18) at its leading edge, which, when the movable frame (6) is moved further forwardly from its locked foremost position (FIG. 4) mentioned above, becomes engaged with the other end (front end) (14a) of the stopper (14) and rotates the stopper (14) counterclockwise in FIG. 4 to release the engagement of the stopper (14) with one of the engagement teeth (12) (FIG. 5) and a second projection (19) which, when the unlocked movable frame (6) is moved rearwardly, becomes engaged with the front end (14a) of the stopper (14) substantially adjacent the rearmost position of the movable frame (6) to rotate the stopper (14) clockwise (FIG. 6).

The above-mentioned cushion member and covering material are attached to the above-mentioned movable frame (6) through a preselected frame member to form the headrest proper (4).

As discussed above, according to the invention, since the spring (15) normally biases the stopper (14) rotatively in such a direction (a counterclock-wise direction in the drawings) that the rear end (14b) thereof is brought into engagement with one of the engagement teeth (12) in the lock plate (11) as well as the spring (17) energizes the movable frame (6) in the rearward direction, the headrest proper (4) can be kept in the fixed or locked condition. During this locked condition, even if any shock is applied to the headrest proper (4) from its forward side toward its rearward side, the headrest proper (4) is sure to receive or bear it.

Also, when the movable frame (6), that is, the headrest proper (4) is pushed forward, the rear end (14b) of the stopper (14) is slided over the engagement teeth (12) sequentially and forwardly. Thus, if such push is released at a proper position, then the headrest proper (4) becomes locked at that position and will never move back from there. In this way, the distance between the occupant's head and the headrest proper (4) can be adjusted arbitrarily.

Further, when the headrest proper (4) is pushed further forwardly from its foremost locking position shown in FIG. 4, then the forward end (14a) of the stopper (14) is engaged with the first projection (18) of the lock plate (11) to rotate it counterclockwise. As a result of this arrangement, the stopper (4) will thereafter be given a counterclockwise rotative biasing force to get out of engagement with the engagement teeth (12). In FIGS. 3 to 6, a stopping piece (20) is rotated against the stopper (14) in this way, and this stopping piece (20) is formed in a portion of the movable frame (6). In this condition, the headrest proper (4) is moved back due to the tension of the spring (17), and then the forward end (14a) of the stopper (14) is brought into engagement with the second projection (19) and is again rotated clockwise, with the rear end (14b) thereof being engaged with the engagement teeth (12) again, so that the stopper (14) becomes locked in its rearmost position shown in FIG. 3. When the headrest proper (4) is pushed forward again, the same operation as mentioned above may be repeated.

As described above, the present invention is advantageous over the conventional headrests in that it is easier in operation: By simply pushing the headrest proper (4) forward, it can be locked in place and thus the distance between the occupant's head and itself can be set best; and, when it is desired to move back the headrest proper (4) by several pitches (or steps), after the headrest proper (4) is once displaced forwardly to be out of locking engagement, it may be moved forwardly from its rearmost position in a sequential manner.

Also, in the invention, the headrest proper (4) can be directly operated to eliminate the need for provision of any operation knob in the seat back (1) or in the headrest (3). Thus, there is no possibility of such operation knob giving any damage to the human body when shocks occur.

Further, according to the invention, since the parallel links (7a) and (7a') respectively existing in the right and left ends of the fixed frame (5) are interconnected with each other at their respective lower ends, there is no mechanism portion present in all of the fixed frame (5) but the above-mentioned right and left end portions. For this reason, the headrest proper (4) can be formed with a through-bore (21) which is effective in improving the appearance and enhancing the commercial value of the present invention.

In addition, due to the use of the parallel links (7a) and (7b), according to the invention, the headrest proper (4) can be moved back and forth with respect to the seat back (1) with little change in its height, so that the headrest proper (4) of the invention can be adjusted far more effectively than those of the conventional headrests that are moved back and forth by means of their rotational movements.

What is claimed is:

1. A headrest for a vehicle seat having stays extending downwards therefrom and supported on a seat back, said heatrest comprising:

a fixed frame having a front and rear and left and right end portions, fixedly secured to the upper ends of said stays;

a pair of movable frames each being disposed above the respective left and right end portions of said fixed frame;

a pair of first parallel links each being at the upper end portion thereof pivotally connected to one of said pair of movable frames and being at the lower end portion thereof pivotally connected to one of the left and right ends of said fixed frame;

a pair of second parallel links each being at the upper end portion thereof pivotally connected to the other of said pair of movable frames and being at the lower end portion thereof pivotally connected to the other of the left and right ends of said fixed frame;

wherein both said pairs of first and second parallel links are of the arrangement that the links are in a parallel spaced-apart relationship with each other;

means for integrally connecting one link of said pair of first links with the opposite one link of said pair of second links;

a pair of lock plates provided on said fixed frame, each of said lock plates having a plurality of engagement teeth, a first projection and a second projection, with the arrangement being such that said plurality of engagement teeth are formed between said first and second projections;

a pair of stoppers each being pivotally fixed to a respective one of said pair of movable frames, each of said pair of stoppers having a first front end portion and a second rear end portion;

a pair of first biasing means each of said pair of first biasing means being respectively extended between one of said pair of stoppers and one of said pair of movable frames, each of said first biasing means being adapted for biasing a respective stopper in such a manner that, (i) when a respective movable frame is in a normal adjusting position, said first biasing means biases said respective stopper into engagement with a selected one of said plurality of engagement teeth on a respective lock plate, and (ii) when said pair of movable frames is moved forwardly of said fixed frame, causing said pair of stoppers to contact said first projection of said lock plate, said pair of first biasing means then biasingly rotates said pair of stoppers out of engagement with the selected one of said plurality of engagement teeth;

a pair of second biasing means each of said pair of second biasing means being respectively extended between said connecting means and the front portion of a respective lock plate, said pair of second biasing means being adapted for biasing said connecting means toward the front of said fixed frame, thereby biasing each of said pair of movable frames toward the rear of said fixed frame; and means for limiting the rotational movement of said pair of stoppers, said limiting means being provided on each of said pair of movable frames.

* * * * *